2,794,815
16-(α-AMINOALKYL)-4-PREGNENE-3,20-DIONES AND THEIR ACYL DERIVATIVES

Raymond M. Dodson, Park Ridge, Ill., assignor, by mesne assignments, to G. D. Searle & Co., Skokie, Ill., a corporation of Delaware No Drawing. Application September 24, 1954, Serial No. 458,252

8 Claims. (Cl. 260—397.3)

This invention is concerned with 16-aminoalkyl steroid derivatives and, more particularly, with 16-(α-aminoalkyl)-4-pregnene-3,20-diones and their acyl derivatives.

These compounds can be represented by the general structural formula

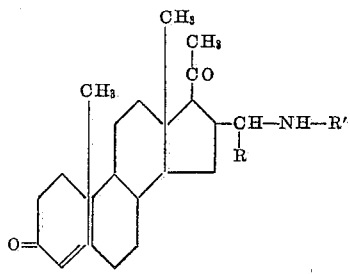

wherein

is a lower alkylene radical and R' is a member of the class consisting of hydrogen and lower hydrocarbon-carbonyl radicals containing 1 to 7 carbon atoms.

In the foregoing structural formula the radical R can be hydrogen or a lower alkyl radical such as methyl, ethyl, straight-chained or branched propyl, butyl, amyl, or hexyl. The radical R' can be a hydrogen or a lower hydrocarbon-carbonyl radical derived from a lower hydrocarbon carboxylic acid such as formic, acetic, propionic, butyric, valeric, caproic, benzoic, toluic, cyclohexanecarboxylic, cyclohexaneacetic, cyclopentanepropionic and similar acids.

These compounds are valuable because of their hormone-like pharmacological action and, more particularly, because of their effect in inhibiting progesterone. The compounds are also valuable in inflammatory conditions such as iritis. Further they are active hypotensive agents.

The compounds of my invention can be conveniently prepared by the methods indicated in my copending applications Serial No. 362,955, filed June 19, 1953, issued as U. S. Patent No. 2,697,109, and Serial No. 449,789, filed August 13, 1954, issued as U. S. Patent No. 2,727,908. The present application is a continuation-in-part of these applications. As shown in these applications, a 3-hydroxy or a 3-acyloxy derivative of 5,16-pregnadien-20-one is treated with a lower nitroalkane of the structural formula

in a mild base with an ionization constant greater than $10^{-4}$ to yield the 16-(α-nitroalkyl) derivative of the structural formula

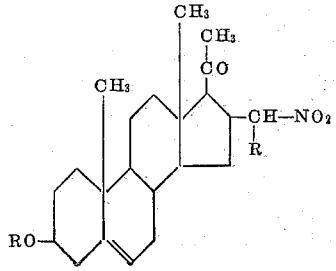

The nitro group is conveniently reduced to an amino group by treatment with iron and an acid such as acetic acid. The amino group thus produced is acylated by conventional procedures using the corresponding acid anhydrides and halides. The 3-acyloxy group is then hydrolyzed to a free hydroxy group by treatment with alkali and methanol, and the resulting 3-hydroxy-16-(α-acylaminoalkyl)-5-pregnen-20-one is then submitted to an oxidation under Oppenauer conditions to yield the corresponding 4-pregnene-3,20-dione derivative.

These methods can also be used for the preparation of the corresponding 11-oxo- and 11-hydroxy-derivatives.

The compounds which constitute my invention and the methods for their preparation will appear more fully from the consideration of the following examples. However, my invention is not to be construed as limited by the details set forth in spirit or in scope. Quantities of materials are indicated in parts by weight.

Example 1

A mixture of 356 parts of 3-acetoxy-5,16-pregnadien-20-one, 3500 parts of nitromethane and 600 parts of anhydrous piperidine is maintained at room temperature for 5 days, concentrated to a small volume under vacuum and diluted with ether. The resulting solution is washed thoroughly first with dilute potassium hydroxide and then with dilute hydrochloric acid, dried over anhydrous sodium sulfate, filtered and evaporated. Crystallization from a mixture of petroleum ether and benzene using charcoal decolorization yields 3-acetoxy-16-nitromethyl-5-pregnen-20-one melting at about 148–149.5° C. An 0.32% chloroform solution shows a specific rotation of $[\alpha]_D = +5°$.

Example 2

To a solution of 24.3 parts of 3-acetoxy-16-nitromethyl-5-pregnen-20-one in 800 parts of methanol, a solution of 20 parts of potassium hydroxide in 150 parts of water is added. After slight heating to effect solution, the mixture is permitted to stand at room temperature for 5 hours. A small quantity of insoluble material is then removed by filtration and the filtrate is neutralized with acetic acid. The resulting precipitate of 3-hydroxy-16-nitromethyl-5-pregnen-20-one is collected on a filter and recrystallized from acetone. The product melts at about 225–227° C. A 1% chloroform solution shows a specific rotation of $[\alpha]_D = +18°$.

Example 3

A mixture of 21 parts of 3-acetoxy-16-nitromethyl-5-pregnen-20-one, 30 parts of iron filings, 200 parts of acetic acid and 600 parts of water is heated under reflux for 4 hours and then filtered. The ferrous hydroxide and the desired amine are precipitated by addition of ammonium hydroxide. The precipitate is separated by filtration through a silica filter aid, dried and pulverized. The powder is extracted exhaustively with benzene. The benzene solution is filtered and thoroughly extracted with 10% acetic acid. This extract is made alkaline by addition of ammonium hydroxide. The resulting precipitate is collected on a filter, dried in an oven and crystallized from dilute methanol. The 3-acetoxy-16-aminomethyl-5-pregnen-20-one thus obtained melts at about 162–163° C. with resolidification of the melt.

Example 4

A solution of 186 parts of 3-acetoxy-16-amino-methyl-5-pregnen-20-one in 1000 parts of pyridine is treated with 1080 parts of acetic anhydride, permitted to stand for 10 hours and then poured into cold water. The resulting precipitate is collected on a filter and crystallized from dilute methanol. The 3-acetoxy-16-acetylaminomethyl-5-pregnen-20-one thus obtained melts at about 167–170° C.

Example 5

A solution of 5 parts of 3-acetoxy-16-acetylaminomethyl-5-pregnen-20-one in 200 parts of methanol is treated with a solution of 5 parts of potassium hydroxide in 50 parts of water. After standing for 10 hours at room temperature, the reaction mixture is filtered and the filtrate is neutralized with 5 parts of dilute acetic acid, heated and diluted with water. Upon cooling the 3 - hydroxy - 16 - acetylaminomethyl - 5 - pregnen - 20-one precipitates, which, recrystallized from dilute methanol, melts at about 232–233° C. A 1% chloroform solution shows a specific rotation of $[\alpha]_D = +6°$.

Example 6

A solution of 24.3 parts of 3-hydroxy-16-acetylaminomethyl-5-pregnen-20-one in 865 parts of toluene and 280 parts of cyclohexanone is concentrated to 42% of its original volume and then treated with a solution of 30 parts of aluminum isopropoxide in 130 parts of toluene. After being heated under reflux for one-half hour, the mixture is poured into 1000 parts of a saturated Rochelle salt solution. This solution is then extracted with ethyl acetate and the ethyl acetate extract is washed thoroughly with Rochelle salt solution. Rochelle salt solutions are once more extracted with ethyl acetate and the organic layers are combined and washed thoroughly with water. Concentration to a small volume and dilution with petroleum ether causes precipitation of 16-acetylaminomethyl-4-pregnene-3,20-dione which, recrystallized from dilute methanol, melts at about 219–220° C. It has the structural formula

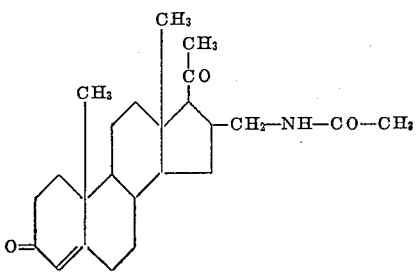

Example 7

A solution of 2 parts of 16-acetylaminomethyl-4-pregnene-3,20-dione in 110 parts of concentrated hydrochloric acid is refluxed for 1 hour and then diluted with water. The resulting clear solution is made basic by addition of ammonium hydroxide whereupon a gum separates. The reaction mixture is extracted with ether and the extract is washed with water and then extracted with 33% glacial acetic acid. This extract is evaporated under a stream of nitrogen and the gummy residue is taken up in ethanol and filtered from insoluble material. The filtrate is evaporated to yield a semi-solid product. The 16-aminomethyl-4-pregnene-3,20-dione acetate thus obtained shows an ultraviolet absorption maximum at 240 millimicrons with a molecular extinction coefficient of 17,000 and infrared maxima at 5.90 and 6.04 microns. It has the structural formula

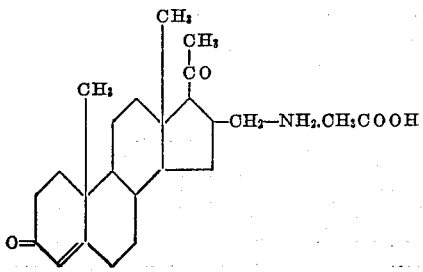

Example 8

A solution of 13 parts of cyclohexanecarbonyl chloride and 5 parts of 3-acetoxy-16-aminoethyl-5-pregnen-20-one in 30 parts of pyridine is kept at 25° C. for 30 minutes. The reaction mixture is then poured into cold water whereupon the 3-acetoxy-16-cyclohexanecarboxylaminomethyl-5-pregnen-20-one separates as an oil.

The foregoing reaction mixture is rendered alkaline with 10% sodium hydroxide and the solid precipitate is collected on a filter, washed with water and dissolved in 250 parts of ethanol. Then 5 parts of potassium hydroxide and 15 parts of water are added and, after standing for 4 hours, the mixture is filtered and the filtrate is neutralized with glacial acetic acid. Upon dilution with water a precipitate forms which is collected on a filter and crystallized successively from dilute acetone and then from benzene. The 3-hydroxy-16-cyclohexanecarboxylaminomethyl-5-pregnen-20-one thus obtained melts at about 210–211.5° C. The specific rotation of an 0.6% chloroform solution is +16.7°.

Example 9

A mixture of 4 parts of 3-hydroxy-16-cyclohexanecarboxylaminomethyl-5-pregnen-20-one, 40 parts of toluene, 30 parts of cyclohexanone and a solution of 3 parts of aluminum isopropoxide in 15 parts of toluene is heated under reflux for 20 minutes, poured into 100 parts of a saturated Rochelle salt solution and steam distilled. The residue is extracted with ethyl acetate. The extract is concentrated and the residue applied in benzene to a chromatography column containing 400 parts of silica gel. The column is washed with benzene and then with benzene solutions containing increasing proportions of ethyl acetate. Elution of the column with a 40% solution of ethyl acetate in benzene and trituration of the resulting eluates with ether causes precipitation of 16-cyclohexanecarboxylaminomethyl-4-pregnene-3,20-dione. On crystallization from dilute acetone, crystals are obtained which melt at about 105–110° C. The specific rotation of a 1.1% chloroform solution is +136°. An ultraviolet absorption maximum is observed at 240 millimicrons with a molecular extinction cofficient of 16,600. The compound has the structural formula

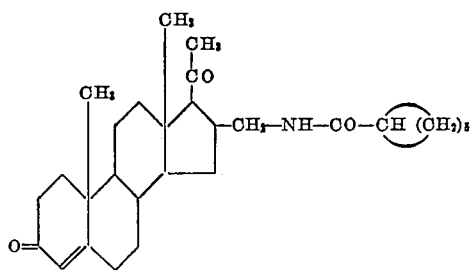

Example 10

A mixture of 5.8 parts of 3-acetoxy-16-aminomethyl-5-pregnen-20-one, 30 parts of pyridine and 12 parts of benzoyl chloride is maintained at room temperature for an hour and then poured into 200 parts of ice water. 50 parts of 4-N sodium hydroxide are added and the mixture is allowed to stand for 3 hours with occasional warming and stirring. The 3-acetoxy-16-benzoylaminomethyl-5-pregnen-20-one is collected on a filter and washed with water.

This product is stirred with 160 parts of methanol, 240 parts of ethanol and 100 parts of dioxane and treated with a solution of 6 parts of potassium hydroxide in 15 parts of water. Stirring is continued for ten hours after which the suspension is filtered and the filtrate is neutralized with glacial acetic acid. The filtrate is evaporated under vacuum to about one-third of its original volume and then diluted with water until crystallization starts. The precipitate is collected on a filter, dissolved in acetone, stirred with charcoal, filtered and treated with cyclohexane to yield 3-hydroxy-16-benzoylaminomethyl-5-pregnen-20-one which melts at about 178–179.5° C. The ultraviolet absorption spectrum shows a maximum at 227 millimicrons with a molecular extinction coefficient of 10,850. The specific rotation of a 0.341% chloroform solution is +68.9°.

*Example 11*

An anhydrous solution of 4 parts of 3-hydroxy-16-benzoylaminomethyl-5-pregnen-20-one in 40 parts of toluene and 30 parts of cyclohexanone is treated with a solution of 3 parts of aluminum isopropoxide in 15 parts of toluene and then heated at reflux for 20 minutes. The mixture is then poured into 100 parts of a saturated solution of Rochelle salt and steam-distilled. The residue is cooled and the precipitate collected on a filter. The product thus obtained is repeatedly recrystallized from a mixture of acetone and cyclohexane. Recrystallized from this mixture, the 16-benzoylaminomethyl-4-pregnene-3,20-dione thus obtained melts at about 199–200.5° C. The specific rotation of an 0.7% chloroform solution is +186.7°. The compound has the structural formula

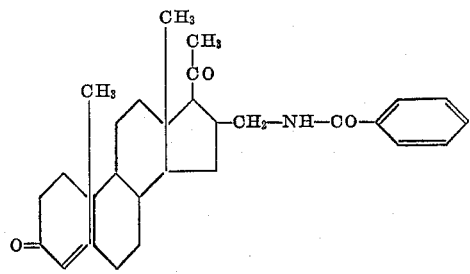

*Example 12*

A mixture of 357 parts of 3-acetoxy-5,16-pregnadien-20-one, 3150 parts of nitroethane and 600 parts of anhydrous piperidine is maintained at room temperature for a week, concentrated under vacuum to a small volume and diluted with ether and a small amount of benzene. The resulting solution is washed successively with dilute potassium hydroxide, water, dilute hydrochloric acid, and again with water, stirred with charcoal, filtered, dried over anhydrous sodium sulfate, again filtered and evaporated. Crystallized from dilute methanol and then from cyclohexane, the 3-acetoxy-16-(α-nitro-ethyl)-5-pregnen-20-one thus obtained melts at about 156–166° C. The specific rotation of a 1% chloroform solution is +17.5°.

A mixture of 45 parts of 3-acetoxy-16-(α-nitroethyl)-5-pregnen-20-one, 60 parts of iron filings, 400 parts of acetic acid and 1200 parts of water is refluxed for 5 hours and then filtered. The filtrate is treated with ammonium hydroxide and the precipitate is separated by filtration through a silica filter aid, dried and then pulverized. This powder is extracted exhaustively with toluene and the toluene solution is filtered and thoroughly extracted with 10% acetic acid. The extract is rendered alkaline by addition of ammonium hydroxide whereby a precipitate is formed which is collected on a filter, dried and crystallized from dilute methanol.

To a solution of 204 parts of 3-acetoxy-16-(α-aminoethyl)-5-pregnen-20-one thus obtained in 1000 parts of pyridine are added 1680 parts of butyric anhydride. After standing at room temperature for 10 hours, the mixture is poured into ice water and the resulting precipitate is collected on a filter and crystallized from dilute methanol. A solution of 100 parts of the 3-acetoxy-16-(α-butyryl-aminoethyl)-5-pregnen-20-one thus obtained in 4000 parts of methanol is treated with a solution of 100 parts of potassium hydroxide in 1000 parts of water. After standing for 12 hours at room temperature, the reaction mixture is filtered and the filtrate is neutralized with dilute acetic acid, heated and diluted with water. On cooling, a precipitate forms which is recrystallized from dilute methanol.

An anhydrous solution of 8 parts of 3-hydroxy-16-(α-butyrylaminoethyl)-5-pregnen-20-one in 100 parts of toluene and 60 parts of cyclohexanone is treated with a solution of 6 parts of aluminum isopropoxide in 30 parts of toluene and then heated at reflux for 30 minutes. The mixture is poured into 200 parts of a saturated solution of Rochelle salt and steam distilled. The residue is cooled and the precipitate is collected on a filter. The product thus obtained is repeatedly recrystallized from a mixture of acetone and cyclohexane. The 16-(α-butyrylaminoethyl)-4-pregnen-3,20-dione shows infrared maxima at 3.02, 5.89, 6.04 and 6.57 microns. The compound has the structural formula

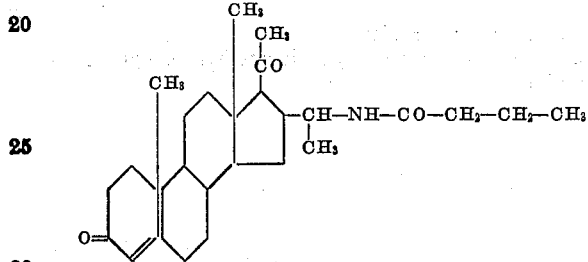

What is claimed is:
1. A compound of the structural formula

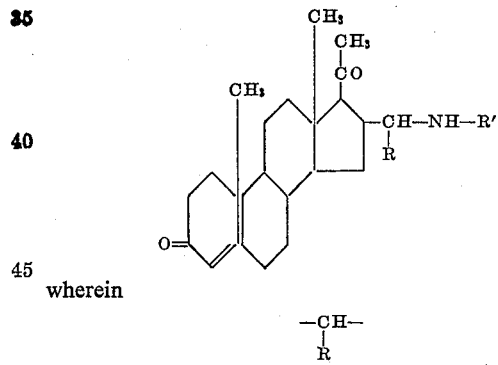

wherein

—CH—
|
R is a lower alkylene radical and R' is a member of the class consisting of hydrogen and lower hydrocarbon-carbonyl radicals containing 1 to 7 carbon atoms.

2. 16-aminomethyl-4-pregnene-3,20-dione.
3. A compound of the structural formula

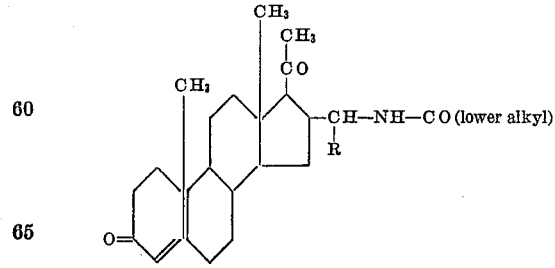

wherein

is a lower alkylene radical.
4. 16-acetylaminomethyl-4-pregnene-3,20-dione.

5. A compound of the structural formula
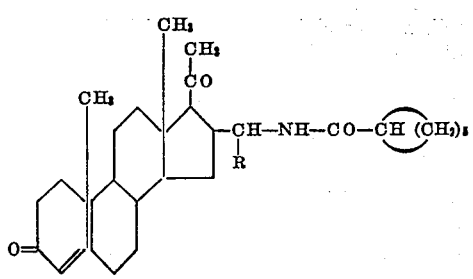
wherein
is a lower alkylene radical.
6. 16-cyclohexanecarboxylaminomethyl - 4 - pregnene-3,20-dione.
7. A compound of the structural formula
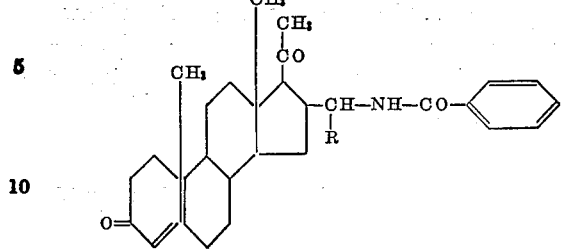
wherein
is a lower alkylene radical.
8. 16-benzoylaminomethyl-4-pregene-3,20-dione.
References Cited in the file of this patent
UNITED STATES PATENTS
2,562,194  Julian _____ July 31, 1951